United States Patent
Boo et al.

(10) Patent No.: US 12,292,093 B2
(45) Date of Patent: May 6, 2025

(54) BRAKE APPARATUS FOR VEHICLE

(71) Applicant: HYUNDAI MOBIS Co., Ltd., Seoul (KR)

(72) Inventors: Sang Pil Boo, Yongin-si (KR); Yeon Jun Lee, Yongin-si (KR); Choong Sik Shin, Yongin-si (KR); Il Ho Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 395 days.

(21) Appl. No.: 17/867,035

(22) Filed: Jul. 18, 2022

(65) Prior Publication Data
US 2023/0279914 A1 Sep. 7, 2023

(30) Foreign Application Priority Data
Mar. 7, 2022 (KR) .................. 10-2022-0028903

(51) Int. Cl.
| F16D 65/18 | (2006.01) |
| F16D 65/00 | (2006.01) |
| F16D 121/24 | (2012.01) |
| F16D 125/36 | (2012.01) |
| F16D 125/50 | (2012.01) |

(52) U.S. Cl.
CPC .......... *F16D 65/18* (2013.01); *F16D 65/0068* (2013.01); *F16D 2121/24* (2013.01); *F16D 2125/36* (2013.01); *F16D 2125/50* (2013.01)

(58) Field of Classification Search
CPC ... F16D 65/18; F16D 65/0068; F16D 2121/24
See application file for complete search history.

(56) References Cited

U.S. PATENT DOCUMENTS

| 9,285,001 B2 | 3/2016 | Son et al. |
| 2016/0032994 A1 | 2/2016 | Sakashita et al. |
| 2020/0307540 A1* | 10/2020 | Jang ................... B60T 7/045 |
| 2021/0071727 A1* | 3/2021 | Jang ................... B60T 13/741 |

FOREIGN PATENT DOCUMENTS

| DE | 112018005504 T5 | 7/2020 |
| JP | 2017-155774 A | 9/2017 |
| KR | 10-2010-0098846 A | 9/2010 |

(Continued)

OTHER PUBLICATIONS

Office Action issued Nov. 29, 2023 for corresponding Korean Patent Application No. 10-2022-0028903.

(Continued)

*Primary Examiner* — Vishal R Sahni
(74) *Attorney, Agent, or Firm* — Morgan, Lewis & Bockius LLP

(57) ABSTRACT

A brake apparatus for a vehicle may include: a caliper body fixed to a vehicle body, a driving unit fixed to the caliper body, and configured to generate a rotational force, a piston unit movably installed in the caliper body, and configured to press or release a brake pad according to a moving direction thereof, a transfer gear unit connected to the driving unit, and rotated by the rotational force received from the driving unit, and a planetary gear unit fixed to the caliper body, and configured to move the piston unit forward and backward in connection with the rotation of the transfer gear unit.

18 Claims, 11 Drawing Sheets

(56) References Cited

FOREIGN PATENT DOCUMENTS

| KR | 10-2012-0033504 A |   | 4/2012 |
|----|-------------------|---|--------|
| KR | 10-2012-0125679 A |   | 11/2012 |
| KR | 10-2019-0122758 A |   | 10/2019 |
| KR | 10-2021-0002011 A |   | 1/2021 |
| KR | 10-2021-0083671 A |   | 7/2021 |
| KR | 20230026133 A | * | 2/2023 |

OTHER PUBLICATIONS

Extended European Search Report dated Dec. 23, 2022, issued in corresponding European Patent Application No. 22185421.9.
Notice of Allowance issued Jun. 10, 2024 for Korean Patent Application No. 10-2022-0028903.

* cited by examiner

BRAKE APPARATUS FOR VEHICLE

CROSS-REFERENCE TO RELATED APPLICATION

This application claims priority from and the benefit of Korean Patent Application No. 10-2022-0028903, filed on Mar. 7, 2022, which is hereby incorporated by reference for all purposes as if set forth herein.

BACKGROUND

Field

Exemplary embodiments of the present disclosure relate to a brake apparatus for a vehicle, and more particularly, to a brake apparatus for a vehicle, which generates a braking force by converting a pedal operation force of a driver into an electrical signal.

Discussion of the Background

In general, a brake apparatus for a vehicle refers to an apparatus which pushes a piston with a driving force such that a pad and a disk are pressed against each other, and brakes a vehicle by using the frictional force between the pad and the disk.

EMB (Electro Mechanical Brake) refers to an apparatus which has a motor driving actuator directly mounted on a caliper and presses a piston through a mechanism such as a gear or screw without using hydraulic pressure, thereby generating a braking force. The EMB can perform active braking and independent braking for each wheel, and thus implement additional functions such as ABS, ESC, TCS and AEB as well as a main braking function, thereby implementing higher performance without hydraulic pressure transfer delay.

The conventional EMB secures quick responsiveness and high efficiency of the piston through a ball screw. However, such a ball screw cannot perform a self locking function capable of restricting its own rotation, due to the structural characteristics thereof. Thus, when power supplied to a motor is cut off, a braking force may be randomly released by a repulsive force between the pad and the piston.

In order to solve such problems, the EMB additionally includes an EPB (Electronic Parking Brake) structure that holds a braking state through a parking brake device, after the main brake device provides a braking force. However, when the EPB structure is applied to the EMB, the capacity of a motor used for main braking is increased, and the reduction ratio of a gear is also increased. Furthermore, when even an ECU (Electronic Control Unit) and an actuator including a motor and gear are mounted on a caliper, an excessive load is applied to the caliper with the increase in weight, and the caliper becomes vulnerable to vibration due to weight concentration.

The related art of the present disclosure is disclosed in Korean Patent Application Publication No. 10-2010-0098846 published on Sep. 10, 2010 and entitled "Disk Brake Having Parking Function."

SUMMARY

The present disclosure has been made in an effort to provide a brake apparatus for a vehicle capable of being reduced in overall size and ensuring stability against weight concentration and vibration.

Various embodiments are directed to a brake apparatus for a vehicle, including: a caliper body to be fixed to a vehicle body; a driving unit fixed to the caliper body, and generates a rotational force; a piston unit movably installed in the caliper body, and presses or releases a brake pad according to a moving direction of the piston unit; a transfer gear unit connected to the driving unit, and rotated by the rotational force received from the driving unit; and a planetary gear unit fixed to the caliper body, and moves the piston unit forward and backward in connection with a rotation of the transfer gear unit.

The caliper body may include: a bridge; a finger extended from one side of the bridge; a cylinder extended from the other side of the bridge, and disposed to face the finger; and an assembly part extended from the cylinder, and supports the driving unit and the planetary gear unit.

The assembly part may include: an assembly body extended to one side of the cylinder in a radial direction of the cylinder; a first assembly part disposed on one side of the assembly body, and supports the driving unit; and a second assembly part disposed on the other side of the assembly body, and supports the planetary gear unit.

The first assembly part may include: a seating groove concavely depressed in the assembly body, such that the driving unit is seated in the seating groove; an insertion hole disposed through the seating groove, such that an output shaft of the driving unit is inserted into the insertion hole; and a fastening hole disposed through the assembly body, such that a fastening member fastened to the driving unit is inserted into the fastening hole.

The fastening hole may face a flange extended from the driving unit.

The first assembly part may further include a sealing member disposed between the seating groove and the driving unit in order to prevent foreign matter from flowing into the driving unit.

The sealing member may be elastically deformable and disposed along an inner circumferential surface of the seating groove.

The second assembly part may protrude from the assembly body in a direction parallel to an axial direction of the piston unit.

The second assembly part may be disposed coaxially with the piston unit.

The planetary gear unit may include: a ring gear fixed to the second assembly part; a sun gear rotatably supported by the ring gear, and engaged with and coupled to the transfer gear unit; a plurality of planetary gears engaged with and coupled to the ring gear and the sun gear, and rotates and revolves in connection with a rotation of the sun gear; and a carrier connected to the planetary gears, and transfers rotational forces of the planetary gears to the piston unit.

The ring gear may include: a fixed part into which the second assembly part is inserted; and a reducer disposed coaxially with the fixed part, such that an inner circumferential surface of the reducer is engaged with and coupled to the planetary gears.

The brake apparatus may further include: a support part disposed between the fixed part and the reducer, and extended inward in a radial direction of the ring gear.

The fixed part may be fixed as an inner circumferential surface thereof is press-fitted onto an outer circumferential surface of the second assembly part.

The fixed part may be bolted to the second assembly part.

The second assembly part may have a plurality of first coupling holes disposed therein, and the fixed part has a plurality of second coupling holes aligned coaxially with the first coupling holes, wherein the second assembly part and the fixed part are coupled to each other by a fixing bolt that sequentially passes through the second coupling hole and the first coupling hole.

The transfer gear unit may include: a first transfer gear rotated with an output shaft of the driving unit; and a second transfer gear rotated in connection with a rotation of the first transfer gear, and engaged with and coupled to the sun gear.

The second transfer gear may have a larger diameter than the first transfer gear.

The brake apparatus may further include a case detachably coupled to the assembly part, and covers the transfer gear unit and the planetary gear unit.

According to the brake apparatus for a vehicle according to the present disclosure, the driving unit, the transfer gear unit, and the planetary gear unit may be directly fixed to the caliper body by the assembly part, which makes it possible to reduce the number of parts and the weight by eliminating a separate structure such as an actuator housing in the related art. Furthermore, the center of gravity may be placed close to the central region of the caliper body, which makes it possible to reduce weight concentration and vibration.

Furthermore, according to the brake apparatus for a vehicle according to the present disclosure, as the ring gear is fixed to the second assembly part and increases the entire reduction ratio of the planetary gear unit, the length or size of the transfer gear unit required for boosting the magnitude of the rotational force generated by the driving unit may be reduced, and the whole length of the actuator may be reduced.

DETAILED DESCRIPTION OF THE ILLUSTRATED EMBODIMENTS

Figure 1:
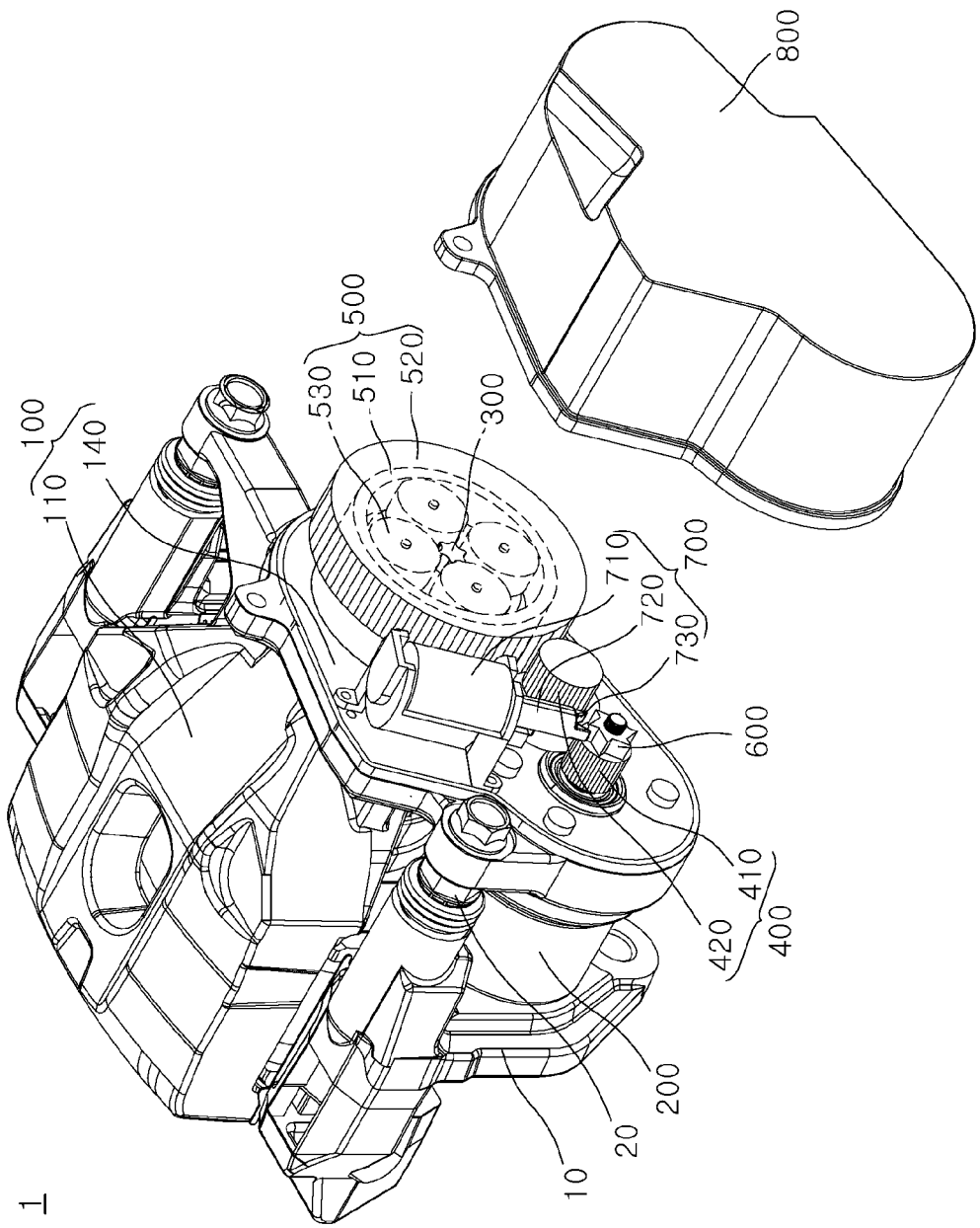
FIG. 1 is a perspective view schematically illustrating the configuration of the brake apparatus for a vehicle in accordance with the embodiment of the present disclosure.

Throughout the specification, when one element is referred to as being "connected to" or "coupled to" another element, it may indicate that the one element is "directly connected or coupled to" the another element or the one element is "indirectly connected or coupled to" the another element with still another element interposed therebetween. In this specification, when an element "includes or has" a component, it may indicate that the element does not exclude another component unless referred to the contrary, but can further include or have another component.

Through this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. Furthermore, the number, shape and size of sub components included in the drawings of this specification and the relative difference between sizes are set for convenience of description, and may not limit embodiments but may be set to various values.

Figure 2:
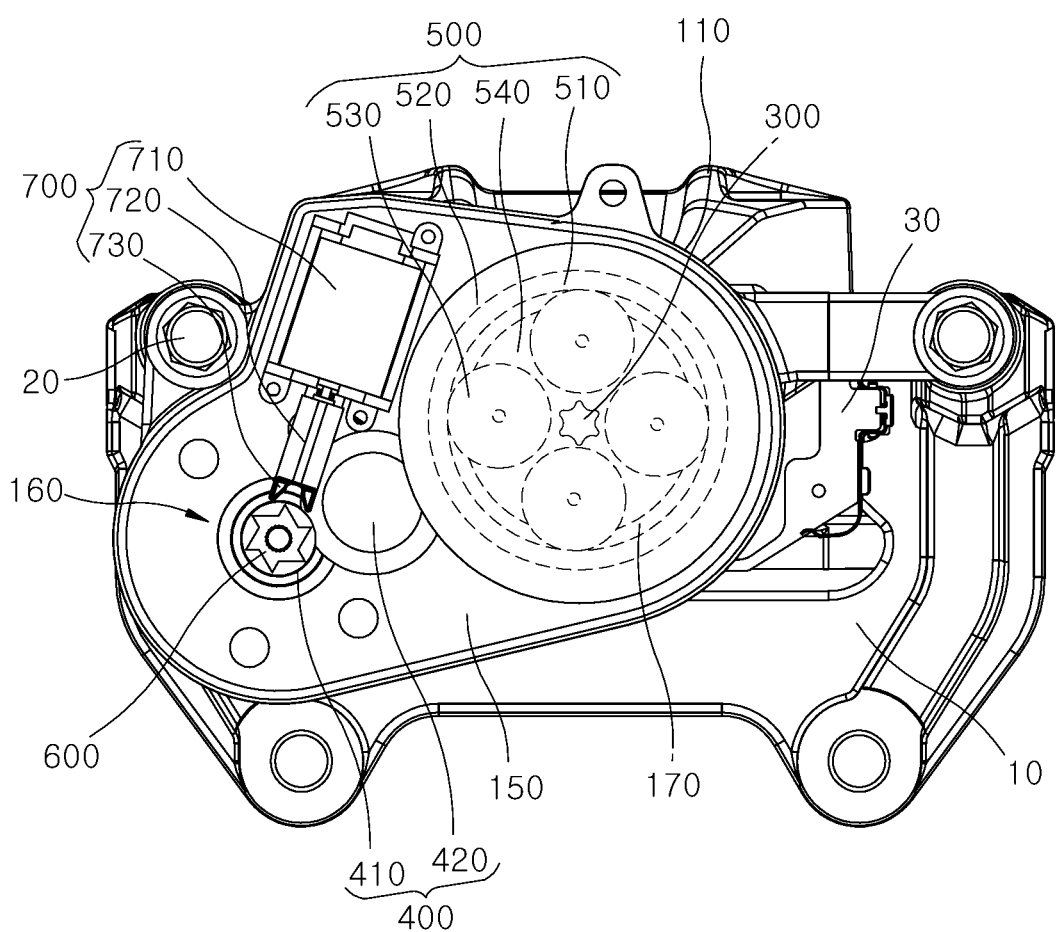
FIG. 2 is a front view schematically illustrating the configuration of the brake apparatus for a vehicle in accordance with the embodiment of the present disclosure.
Figure 3:
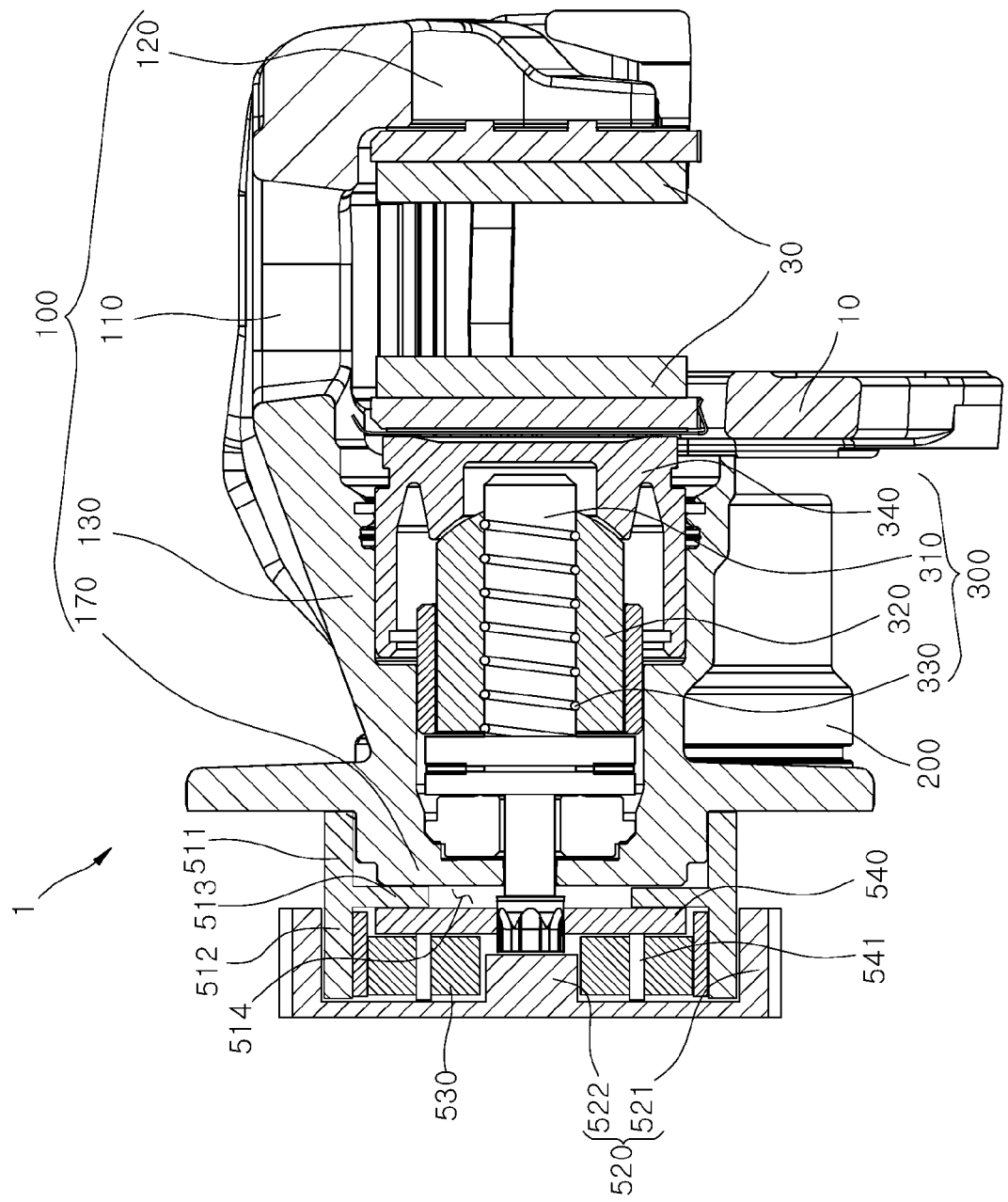
FIG. 3 is a cross-sectional view schematically illustrating the configuration of the brake apparatus for a vehicle in accordance with the embodiment of the present disclosure.

FIG. 1 is a perspective view schematically illustrating the configuration of a brake apparatus for a vehicle in accordance with an embodiment of the present disclosure, FIG. 2 is a front view schematically illustrating the configuration of the brake apparatus for a vehicle in accordance with the embodiment of the present disclosure, and FIG. 3 is a cross-sectional view schematically illustrating the configuration of the brake apparatus for a vehicle in accordance with the embodiment of the present disclosure.

Referring to FIGS. 1 to 3, a brake apparatus 1 for a vehicle in accordance with an embodiment of the present disclosure includes a caliper body 100, a driving unit 200, a piston unit 300, a transfer gear unit 400, a planetary gear unit 500, a parking gear unit 600, a constraint unit 700, and a case 800.

The caliper body 100 is fixed to a vehicle body through a torque member 10, and serves to support the driving unit 200, the piston unit 300, the transfer gear unit 400, the planetary gear unit 500, and the constraint unit 700, which will be described below. The caliper body 100 has both sides slidably coupled to the torque member 10 through a guide pin 20. In this case, the caliper body 100 may be slidably supported in direction parallel to the axial direction of a brake disk (not illustrated). The caliper body 100 is slid in the direction parallel to the axial direction of the brake disk (not illustrated) by a reaction force which is generated as the piston unit 300 to be described below presses a brake pad 30.

The caliper body 100 in accordance with the embodiment of the present disclosure includes a bridge 110, a finger 120, a cylinder 130, and an assembly part 140.

The bridge 110 forms the upper exterior of the caliper body 100. The bridge 110 in accordance with the embodiment of the present disclosure may be formed in the shape of a plate whose inner surface is spaced apart by a predetermined distance from the outer circumferential surface of the brake disk, while facing the outer circumferential surface of the brake disk. The specific shape and area of the bridge 110 may be variously changed in design depending on the size of the brake disk or the like.

The finger 120 is extended from one side of the bridge 110, and forms the front exterior of the caliper body 100. The finger 120 in accordance with the embodiment of the present disclosure is vertically extended downward from a front end of the bridge 110. The finger 120 has an inner surface facing the brake pad 30 which is disposed outside the brake disk in the widthwise direction of the vehicle, between the pair of brake pads 30. The finger 120 presses or releases the brake pads 30 in connection with the sliding of the caliper body 100.

The cylinder 130 is extended from the other side of the bridge 110, and forms the rear exterior of the caliper body 100. The cylinder 130 movably supports the piston unit 300 which will be described below. The cylinder 130 in accordance with the embodiment of the present disclosure is vertically extended downward from the rear end of the bridge 110. The cylinder 130 is formed in a hollow cylindrical shape whose one side is open. The open side of the cylinder 130 faces the brake pad 30 which is disposed inside the brake disk in the widthwise direction of the vehicle, between the pair of brake pads 30.

The assembly part 140 is extended from the cylinder 130, and supports the driving unit 200, the transfer gear unit 400, and the planetary gear unit 500 which will be described below. That is, the assembly part 140 functions as a component that provides mechanical connections of the driving unit 200, the transfer gear unit 400, and the planetary gear unit 500 with respect to the caliper body 100. Through the assembly part 140, the driving unit 200, the transfer gear unit 400, and the planetary gear unit 500 may be directly fixed to the caliper body 100 without a separate structure such as an actuator housing, which makes it possible to reduce the number of parts. Furthermore, the center of gravity may be placed close to the central region of the caliper body 100, which makes it possible to reduce weight concentration and vibration.

Figure 4:
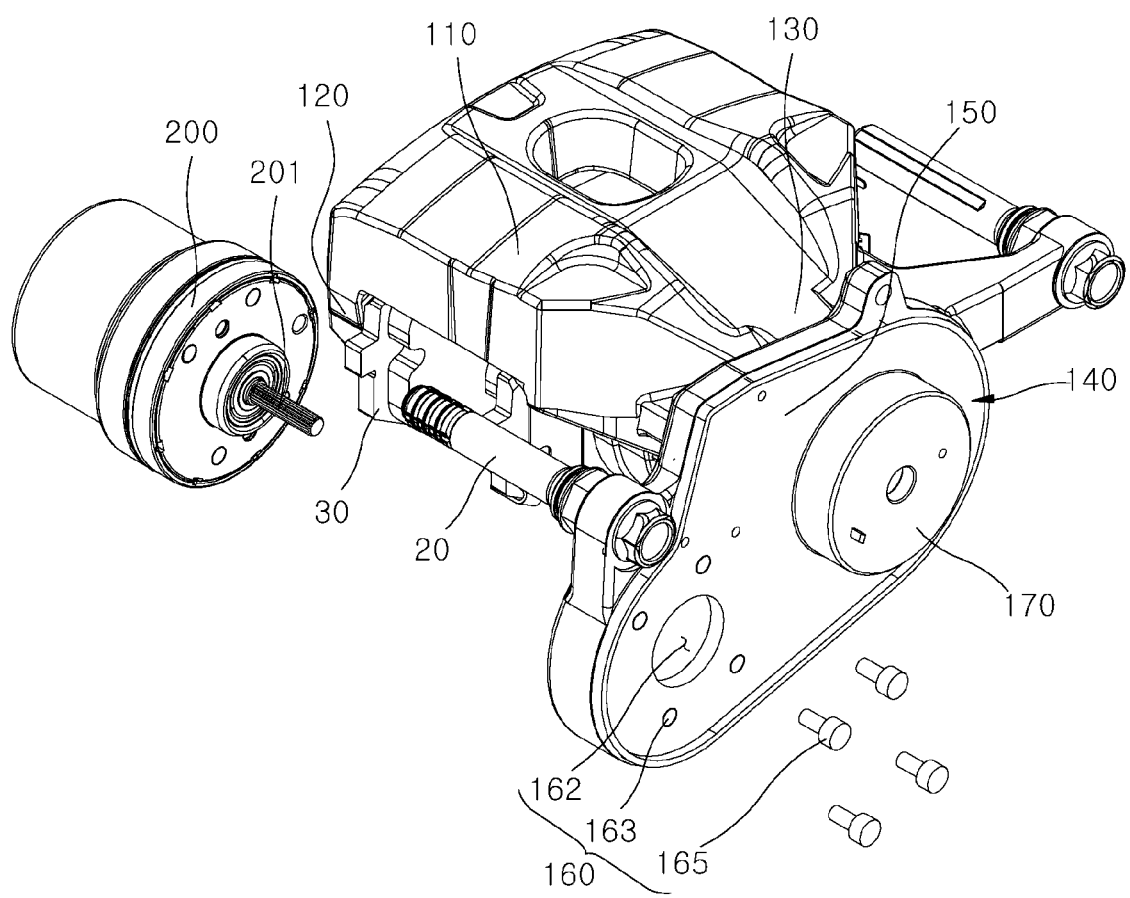
FIG. 4 is a perspective view schematically illustrating the structure of an assembly part in accordance with the embodiment of the present disclosure.
Figure 5:
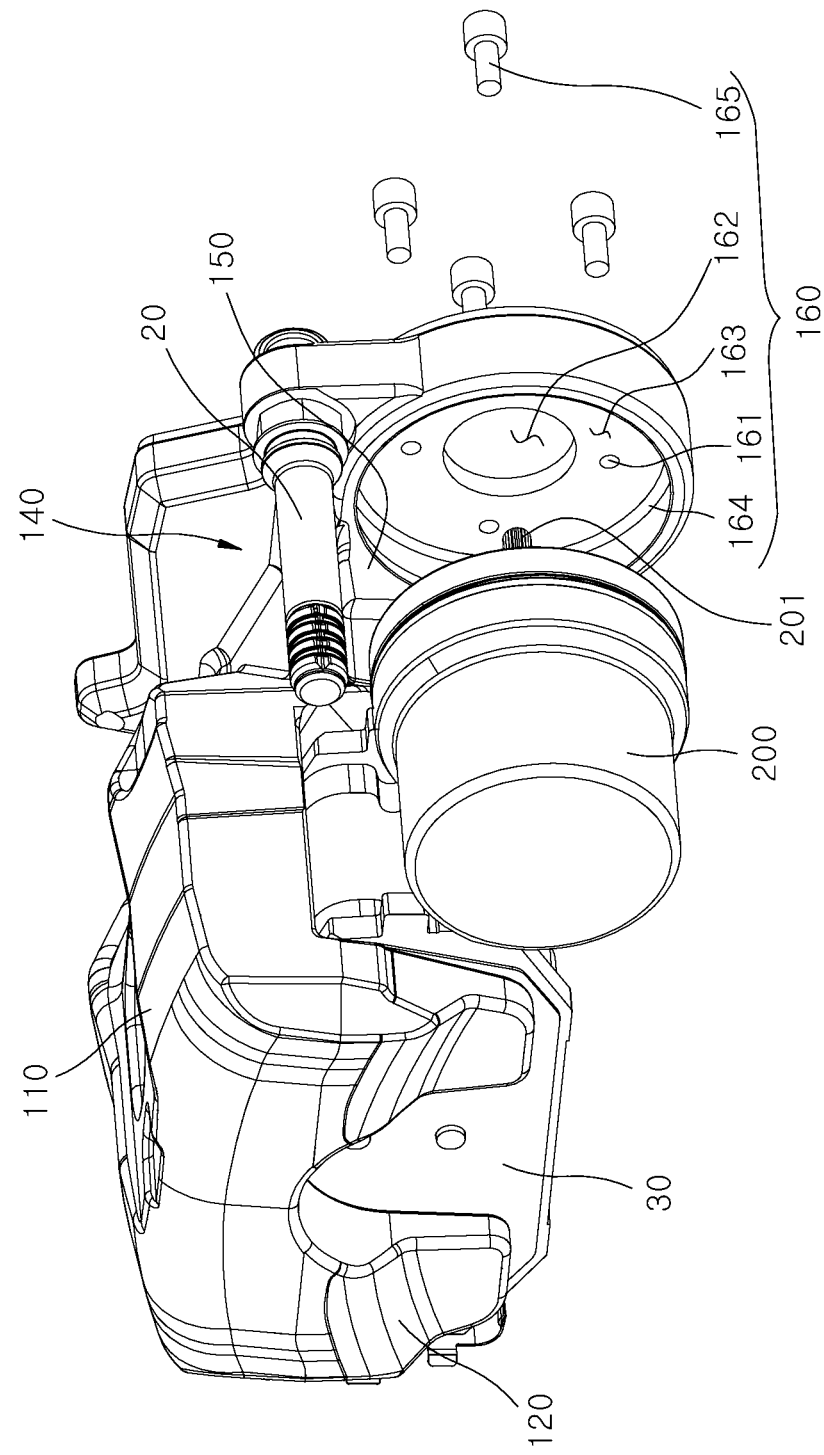
FIG. 5 is a perspective view illustrating the structure of the assembly part in accordance with the embodiment of the present disclosure, when seen from a different point of view.

FIG. 4 is a perspective view schematically illustrating the configuration of the assembly part in accordance with the embodiment of the present disclosure, and FIG. 5 is a perspective view schematically illustrating the configuration of the assembly part in accordance with the embodiment of the present disclosure, when seen from a different point of view.

Referring to FIGS. 4 and 5, the assembly part 140 in accordance with the embodiment of the present disclosure includes an assembly body 150, a first assembly part 160, and a second assembly part 170.

The assembly body 150 forms a schematic exterior of the assembly part 140. The assembly body 150 in accordance with the embodiment of the present disclosure may be formed in the shape of a plate that is extended from the opposite surface of the other surface of the cylinder 130, i.e. the surface on which the cylinder 130 is disposed so as to face the brake pad 30, to one side (left side in FIG. 4) in the radial direction of the cylinder 130. The assembly body 150 may be integrated with the cylinder 130 through casting molding, when the caliper body 100 is manufactured. The specific cross-sectional shape of the assembly body 150 may be variously changed in design depending on the arrangement of the driving unit 200, the transfer gear unit 400, and the planetary gear unit 500, in addition to the shape illustrated in FIGS. 4 and 5.

The first assembly part 160 is provided on one side of the assembly body 150, and supports the driving unit 200.

The first assembly part 160 in accordance with the embodiment of the present disclosure includes a seating groove 161, an insertion hole 162, a fastening hole 163, and a sealing member 164.

The seating groove 161 is formed in the shape of a groove which is concavely formed from the inner surface of the assembly body 150, facing the cylinder 130, to the inside of the assembly body 150. The seating groove 161 is disposed on the left side of the assembly body 150 in FIG. 4. The seating groove 161 has a substantially circular cross-section, and the central axis of the seating groove 161 is disposed in parallel to the central axis of the cylinder 130. The driving unit 200 to be described below is inserted into the seating groove 161, and the front surface portion of the driving unit 200 is seated on the bottom surface of the seating groove 161. The diameter and depth of the seating groove 161 may be variously changed in design depending on the size of the driving unit 200 which will be described below.

The insertion hole 162 is formed in the shape of a hole formed through the seating groove 161. The central axis of the insertion hole 162 is located coaxially with the central axis of the seating groove 161. The insertion hole 162 may have a substantially circular cross-section. An output shaft 201 extended from the front surface portion of the driving unit 200 which will be described below is inserted into the insertion hole 162. The diameter of the insertion hole 162 may be variously changed in design depending on the diameter of the output shaft 201.

The fastening hole 163 is spaced apart from the insertion hole 162, and formed in the shape of a hole formed through the assembly body 150. As illustrated in FIGS. 4 and 5, the fastening hole 163 may be disposed at a position where the fastening hole 163 directly penetrates the seating groove 161. The fastening hole 163 may be formed as a plurality of fastening holes. The plurality of fastening holes 163 are each disposed at a position spaced by a predetermined distance apart from the insertion hole 162 in the radial direction of the insertion hole 162, and arranged in the circumferential direction of the insertion hole 162 so as to be spaced apart from each other.

A fastening member 165 is inserted into the fastening hole 163, and fastened to the driving unit 200 so as to fix the driving unit 200 seated in the seating groove 161. The fastening member 165 in accordance with the embodiment of the present disclosure may be formed in a bolt shape with a screw thread formed on the outer circumferential surface thereof. The fastening member 165 is provided as a plurality of fastening members that are inserted into the respective fastening holes 163. The diameter of the fastening hole 163 may be variously changed in design depending on the diameter of the fastening member 165.

The sealing member 164 is provided between the seating groove 161 and the driving unit 200, and serves to prevent foreign matters from flowing into the driving unit 200. The sealing member 164 in accordance with the embodiment of the present disclosure substantially has a ring shape, and is disposed along the inner circumferential surface of the seating groove 161. The sealing member 164 may be made of an elastically deformable material such as rubber or silicone. The sealing member 164 comes into close contact with the circumferential surface of a front surface portion of the driving unit 200 inserted into the seating groove 161. Thus, the sealing member 164 may seal the gap between the driving unit 200 and the seating groove 161 to block foreign matters such as water or dust from flowing into the driving unit 200, and may be elastically deformed to offset vibration generated from the driving unit 200.

The second assembly part 170 is provided on the other side of the assembly body 150, and serves to support the planetary gear unit 500. The second assembly part 170 in accordance with the embodiment of the present disclosure may be formed in the shape of a cylinder protruding from the outer surface of the assembly body 150 in a direction parallel to the axial direction of the piston unit 300 which will be described below. The central axis of the second assembly part 170 is located coaxially with the central axis of the piston unit 300. The specific coupling structure between the second assembly part 170 and the planetary gear unit 500 will be described below.

The driving unit 200 is fixed to the caliper body 100, and generates a rotational force by using power received from the outside. The driving unit 200 in accordance with the embodiment of the present disclosure may be exemplified as a cylindrical electric motor that is electrically connected to a battery of the vehicle, receives power from the battery, and generates a rotational force through an electromagnetic interaction between a stator and a rotor. The output shaft 201 that outputs the rotational force generated by the driving unit 200 while rotated on the central axis thereof protrudes from the front surface portion of the driving unit 200.

Hereafter, the coupling structure between the driving unit 200 and the first assembly part 160 will be described in detail with reference to FIGS. 1 and 5.

With the output shaft 201 disposed so as to face the seating groove 161, the front surface portion of the driving unit 200 is inserted into the seating groove 161.

The output shaft 201 protruding from the front surface portion of the driving unit 200 is inserted through the insertion hole 162, and has an end protruding to the outside of the assembly body 150.

The driving unit 200 inserted into the seating groove 161 is supported while the edge of the front surface portion thereof is brought into close contact with the sealing member 164.

The fastening member 165 is inserted sequentially through the fastening hole 163 and the front surface portion of the driving unit 200, and bolted to the front surface portion of the driving unit 200 through a screw thread formed on the outer circumferential surface thereof.

Figure 6:
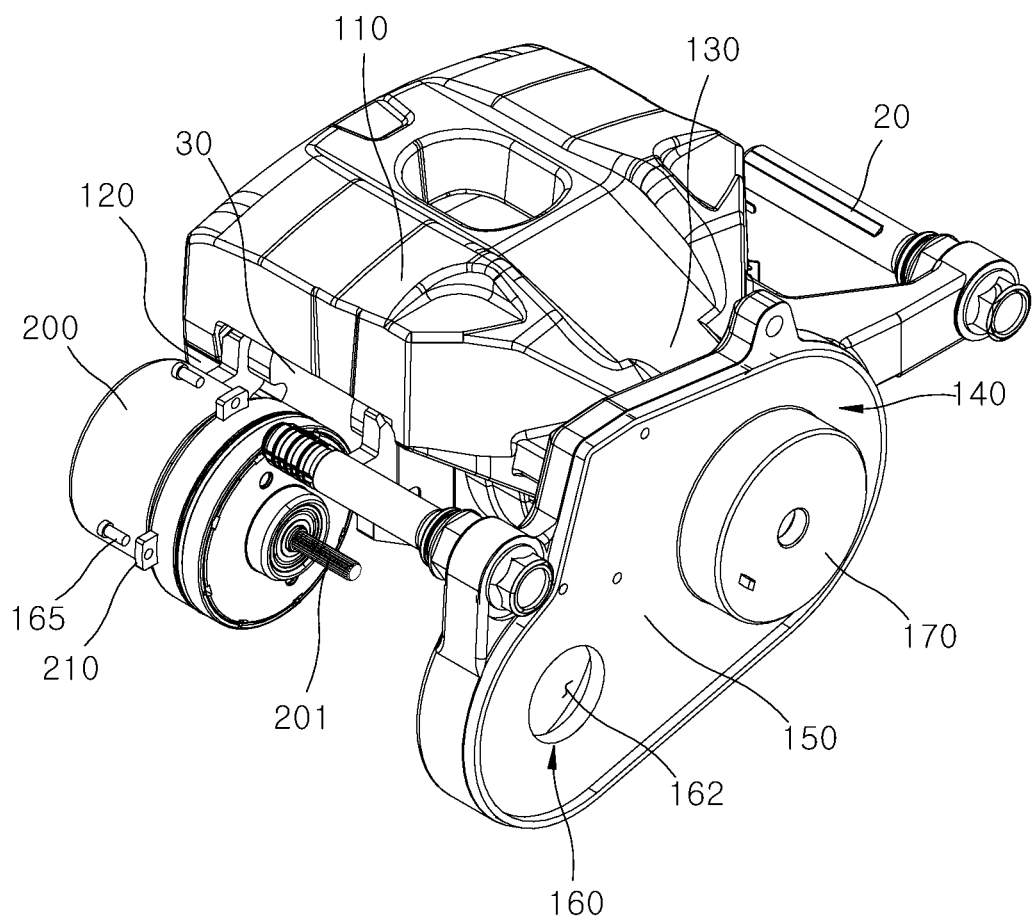
FIGS. 6 and 7 are diagrams schematically illustrating a modified example of a coupling structure between a first assembly part and a driving unit in accordance with the embodiment of the present disclosure.
Figure 7:
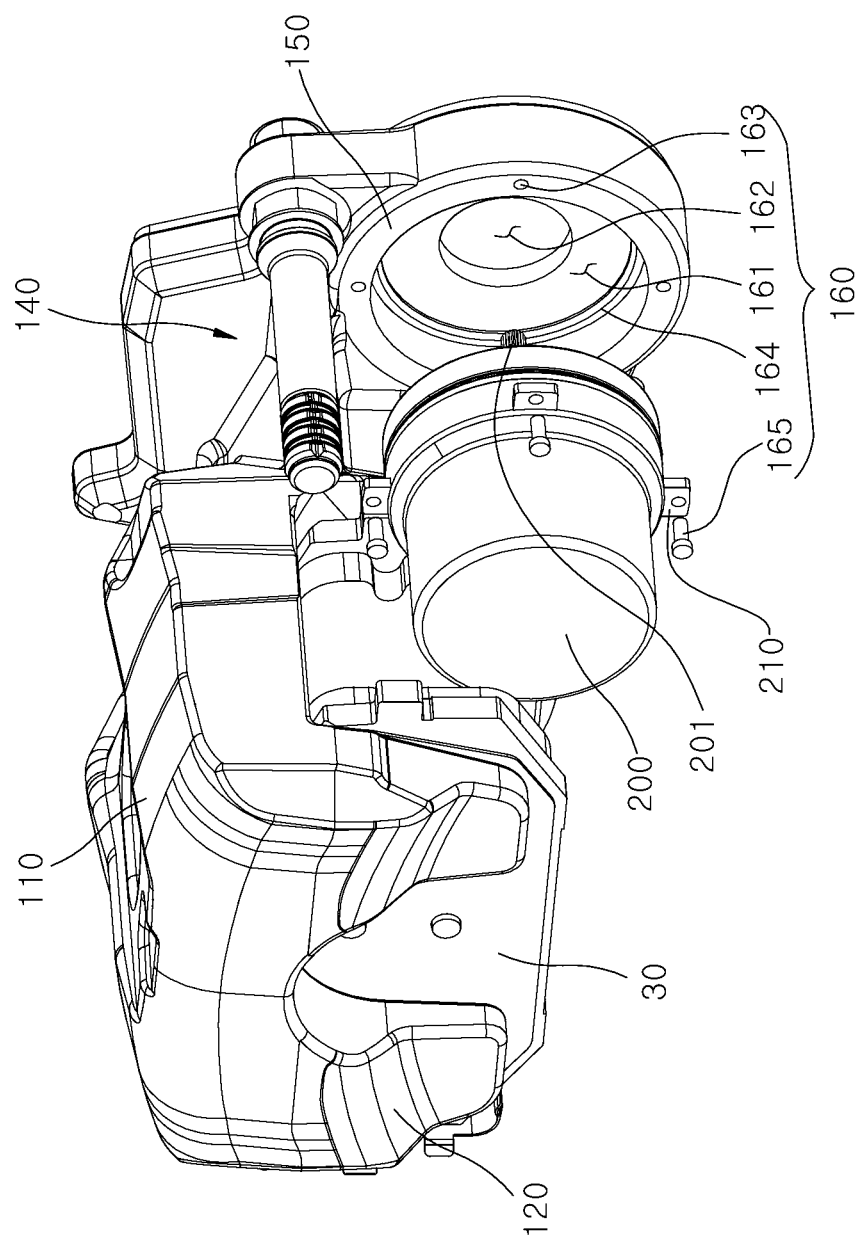

FIGS. 6 and 7 are diagrams schematically illustrating a modified example of the coupling structure between the first assembly part and the driving unit in accordance with the embodiment of the present disclosure.

Hereafter, the modified example of the coupling structure between the driving unit 200 and the first assembly part 160 will be described in detail with reference to FIGS. 6 and 7. During this process, descriptions overlapping those of the coupling structure between the driving unit 200 and the first assembly part 160 which are illustrated in FIGS. 4 and 5 will be omitted herein, for convenience of description.

Referring to FIG. 6, the driving unit 200 in accordance with the present modification includes a plurality of flanges 210 formed thereon.

The flanges 210 in accordance with the embodiment of the present disclosure may be formed in the shape of a plate extended from the outer circumferential surface of the driving unit 200 in the radial direction of the driving unit 200. The plurality of flanges 210 are arranged in the circumferential direction of the driving unit 200 so as to be spaced by a predetermined distance apart from each other. The number of the plurality of flanges 210 is not limited to that illustrated in FIGS. 6 and 7, but may be changed to various values.

As illustrated in FIG. 7, the fastening hole 163 is formed in the edge region of the seating groove 161 so as to directly penetrate the assembly body 150, while facing the corresponding flange 210. The plurality of fastening holes 163 are disposed at positions facing the respective flanges 210.

As the front surface portion of the driving unit 200 is inserted into the seating groove 161, the flanges 210 are brought into contact with the inner surface of the assembly body 150, formed along the edge region of the seating groove 161, and supported by the inner surface of the assembly body 150.

The fastening member 165 is inserted sequentially through the fastening hole 163 and the flange 210, and bolted to the flange 210 through a screw thread formed on the outer circumferential surface thereof.

The piston unit 300 is movably installed in the caliper body 100, or specifically the cylinder 130. The piston unit 300 is moved forward and backward in the cylinder 130 in connection with the rotational force generated by the driving unit 200. The piston unit 300 applies or removes a braking force to or from the vehicle while pressing or releasing the pad part 30 against or from the brake disk according to the direction in which the piston unit 300 is moved forward or backward.

The piston unit 300 in accordance with the embodiment of the present disclosure includes a ball screw 310, a ball nut 320, a rolling body 330, and a piston 340.

The ball screw 310 receives the rotational force, generated by the driving unit 200, through the planetary gear unit 500 to be described below, and is rotated by the received rotational force. The ball screw 310 in accordance with the embodiment of the present disclosure is formed in substantially a rod shape, and rotatably installed in the cylinder 130. The longitudinal direction of the ball screw 310 is set in parallel to the longitudinal direction of the cylinder 130. The ball screw 310 has a groove formed on the outer circumferential surface thereof, such that a half of the circumference of the rolling body 330 to be described below is seated in the groove. Such a groove is extended helically in the longitudinal direction of the ball screw 310, and provides a cyclic path of the rolling body 330. The ball screw 310 has a rear end portion that protrudes to the outside of the second assembly part 170 through the central axis of the second assembly part 170. The rear end portion of the ball screw 310 is connected to a carrier 540 of the planetary gear unit 500 which will be described below. More specifically, spline teeth may be formed on the outer circumferential surface of the rear end portion of the ball screw 310, and engaged with and coupled to the inner circumferential surface of the carrier 540. Therefore, when the carrier 540 is rotated, the ball screw 310 may be rotated on the central axis with the carrier 540.

The ball nut 320 is linearly reciprocated in the longitudinal direction of the ball screw 310 in connection with the rotation of the ball screw 310. The ball nut 320 in accordance with the embodiment of the present disclosure may be formed in a hollow cylindrical shape to surround the outer circumferential surface of the ball screw 310. The ball nut 320 has an inner circumferential surface which is spaced apart by a predetermined distance from the outer circumferential surface of the ball screw 310 while facing the outer circumferential surface of the ball screw 310. The ball nut 320 has a groove formed on the inner circumferential surface thereof, such that the other half of the circumference of the rolling body 330 to be described below is seated in the groove. Such a groove is extended helically in the longitudinal direction of the ball nut 320, and provides the cyclic path of the rolling body 330. When the ball screw 310 is rotated, the ball nut 320 is linearly reciprocated back and forth in the longitudinal direction of the ball screw 310 by the cyclic movement of the rolling body 330.

The rolling body 330 is provided between the ball screw 310 and the ball nut 320, and has both sides that come into rolling contact with the ball screw 310 and the ball nut 320, respectively. The rolling body 330 in accordance with the embodiment of the present disclosure is formed in a substantially spherical shape, and installed between the ball screw 310 and the ball nut 320. The circumference of the rolling body 330 comes into rolling contact with the grooves formed on the outer circumferential surface of the ball screw 310 and the inner circumferential surface of the ball nut 320. The rolling body 330 is cyclically moved along the grooves when the ball screw 310 is rotated, and converts the rotation of the ball screw 310 into the linear reciprocation of the ball nut 320.

The piston 340 is linearly reciprocated with the ball nut 320, and presses or releases the brake pad 30 depending on the moving direction. The piston 340 in accordance with the embodiment of the present disclosure is installed in the cylinder 130 so as to slide in the longitudinal direction of the cylinder 130. The piston 340 has a rear end coupled to the front end of the ball nut 320 integrally, and may be linearly reciprocated in the longitudinal direction of the cylinder 130 with the ball nut 320. As the ball nut 320 is moved forward, the front end of the piston 340 is brought into contact with the brake pad 30, and presses the brake pad 30 toward the brake disk, thereby generating a brake force. As the ball nut 320 is moved backward, the piston 340 is separated from the brake pad 30 and releases the brake pad 30, thereby removing the brake force.

The transfer gear unit 400 is rotated by the rotational force received from the driving unit 200, and transfers the rotational force, generated by the driving unit 200, to the planetary gear unit 500 which will be described below.

The transfer gear unit 400 in accordance with the embodiment of the present disclosure includes a first transfer gear 410 and a second transfer gear 420.

The first transfer gear 410 is connected to the output shaft 201 of the driving unit 200, and rotated with the output shaft 201 of the driving unit 200. The first transfer gear 410 in accordance with the embodiment of the present disclosure may be formed as a hollow helical gear or spur gear which has teeth provided on the outer circumferential surface thereof. The central axis of the first transfer gear 410 is disposed coaxially with the output shaft 201 of the driving unit 200. The output shaft 201 is inserted through the center of the first transfer gear 410. The first transfer gear 410 is rotated at the same angular velocity as the output shaft 201 of the driving unit 200 during the operation of the driving unit 200.

The second transfer gear 420 is engaged with and coupled to the first transfer gear 410, and rotated in connection with the rotation of the first transfer gear 410. The second transfer gear 420 in accordance with the embodiment of the present disclosure may be formed as a hollow helical gear or spur gear which has teeth provided on the outer circumferential surface thereof. The second transfer gear 420 is engaged and coupled between the first transfer gear 410 and a sun gear 520 of the planetary gear unit 500 which will be described below The central axis of the second transfer gear 420 is disposed in parallel to the central axis of the first transfer gear 410. The second transfer gear 420 is rotatably supported by the assembly body 150 through a separate rotating shaft (not illustrated). The second transfer gear 420 is formed to have a larger diameter than the first transfer gear 410. Thus, the second transfer gear 420 may boost the magnitude of the rotational force transferred from the first transfer gear 410 to the planetary gear unit 500.

The planetary gear unit 500 is fixed to the caliper body 100, and moves the piston unit 300 forward and backward in connection with the rotation of the transfer gear unit 400.

Figure 8:
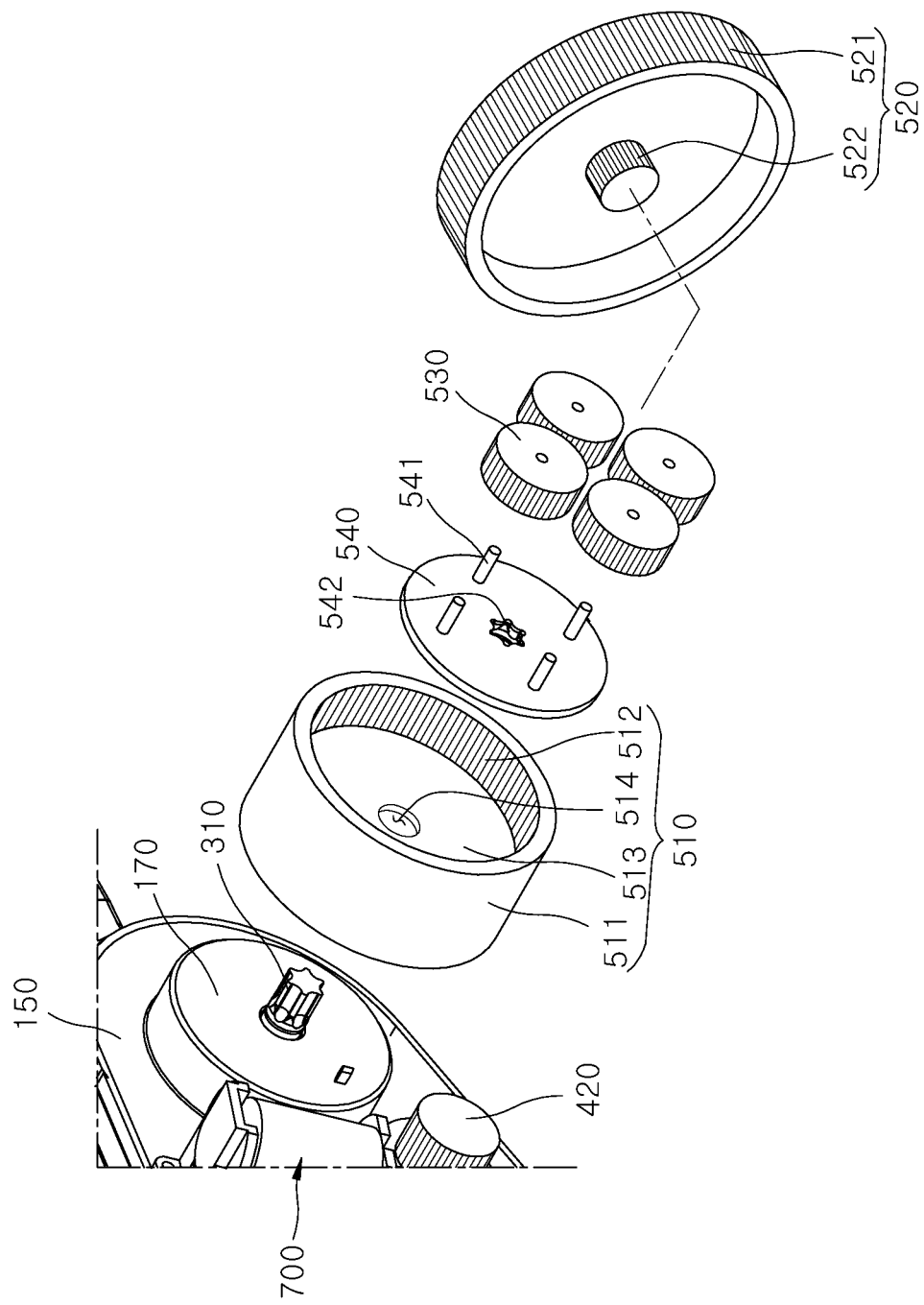
FIG. 8 is an exploded perspective view schematically illustrating the configuration of a planetary gear unit in accordance with the embodiment of the present disclosure.
Figure 9:
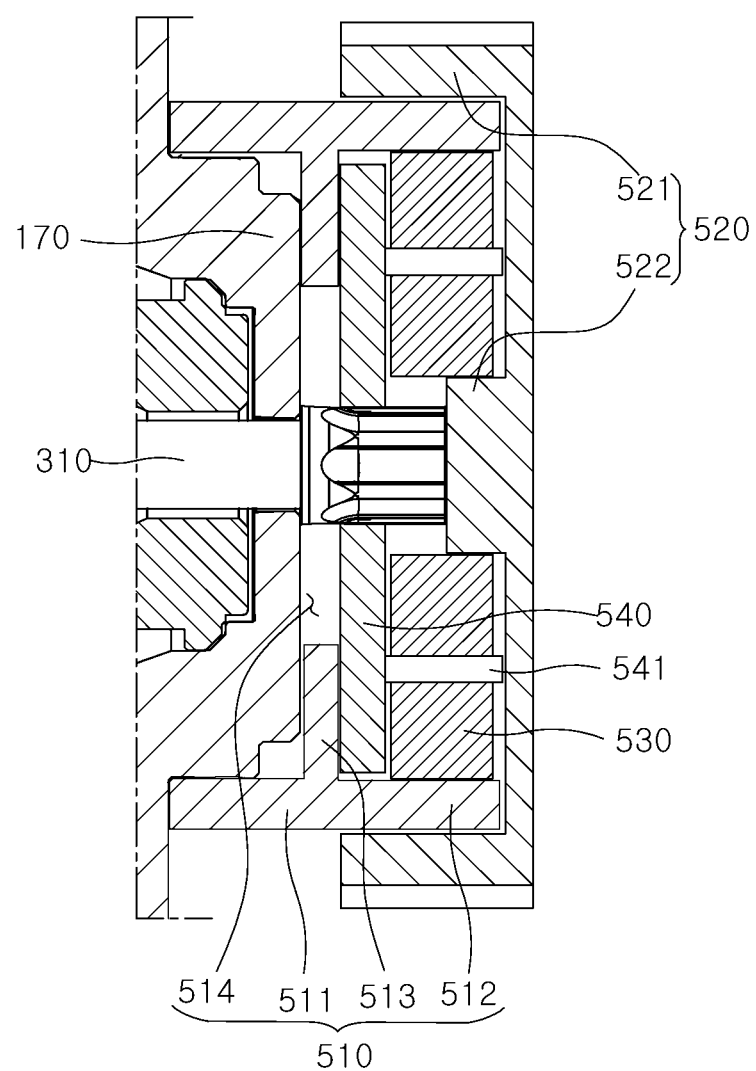
FIG. 9 is an expanded cross-sectional view schematically illustrating the configuration of the planetary gear unit in accordance with the embodiment of the present disclosure.

FIG. 8 is an exploded perspective view schematically illustrating the configuration of the planetary gear unit in accordance with the embodiment of the present disclosure, and FIG. 9 is an exploded cross-sectional view schematically illustrating the configuration of the planetary gear unit in accordance with the embodiment of the present disclosure.

Referring to FIGS. 8 and 9, the planetary gear unit 500 in accordance with the embodiment of the present disclosure includes a ring gear 510, a sun gear 520, a planetary gear 530, and the carrier 540.

The ring gear 510 is fixed to the second assembly part 170, and supports the sun gear 520, the planetary gear 530, and the carrier 540 which will be described below. Thus, the ring gear 510 can directly support the sun gear 520, the planetary gear 530, and the carrier 540 with respect to the caliper body 100 without a separate structure such as an actuator housing, which makes it possible to reduce the weight and cost. Furthermore, as the ring gear 510 is fixed to the second assembly part 170 and increases the entire reduction ratio of the planetary gear unit 500, the length or size of the transfer gear unit 400 required for boosting the magnitude of the rotational force generated by the driving unit 200 may be reduced, and the whole length of the assembly part 140 may be reduced.

The ring gear 510 in accordance with the embodiment of the present disclosure includes a fixed part 511, a reducer 512, and a support part 513.

The fixed part 511 forms the exterior of one side of the ring gear 510, and is fixed to the second assembly part 170. The fixed part 511 in accordance with the embodiment of the present disclosure may be formed in a hollow cylindrical shape with both open sides. With the second assembly part 170 inserted into the fixed part 511, the inner circumferential surface of the fixed part 511 is press-fitted onto the outer circumferential surface of the second assembly part 170, such that the fixed part 511 is fixed.

The reducer 512 forms the exterior of the other side of the ring gear 510, and is engaged with and coupled to the planetary gear 530 which will be described below. The reducer 512 in accordance with the embodiment of the present disclosure may be formed in a cylindrical shape with both open sides. The reducer 512 has gear teeth formed on the inner circumferential surface thereof so as to be engaged with and coupled to the outer circumferential surface of the planetary gear 530. The central axis of the reducer 512 is located coaxially with the central axis of the fixed part 511. In this case, ends of the fixed part 511 and the reducer 512, facing each other, may be connected as one body to form a cylindrical shape which is continuously extended in the axial direction of the ball screw 310.

The support part 513 is provided between the fixed part 511 and the reducer 512, and supports the carrier 540 which will be described below. The support part 513 in accordance with the embodiment of the present disclosure may have a disk shape that is extended from the boundary line between the fixed part 511 and the reducer 512 to the inside in the radial direction of the ring gear 510. The support part 513 has a through-hole 514 formed in the center thereof such that the rear end of the ball screw 310 protruding to the outside of the second assembly part 170 passes through the through-hole 514.

The sun gear 520 is rotatably supported by the ring gear 510, and engaged with and coupled to the transfer gear unit 400.

The sun gear 520 in accordance with the embodiment of the present disclosure includes a first sun gear 521 and a second sun gear 522.

The first sun gear 521 is engaged with and coupled to the second transfer gear 420, and rotated in connection with the rotation of the second transfer gear 420. The first sun gear 521 in accordance with the embodiment of the present disclosure is formed in a cylindrical shape whose one side is open. The first sun gear 521 is disposed so that the open side thereof faces the ring gear 510. The ring gear 510 or specifically the reducer 512 is inserted into the first sun gear 521, and the inner circumferential surface of the first sun gear 521 rotatably comes in contact with the outer circumferential surface of the reducer 512. The first sun gear 521 has gear teeth protruding from the outer circumferential surface thereof, and is engaged with and coupled to the outer circumferential surface of the second transfer gear 420.

The second sun gear 522 is extended from the first sun gear 521, and engaged with and coupled to the planetary gear 530 which will be described below. The second sun gear 522 in accordance with the embodiment of the present disclosure may be formed in the shape of a cylinder extended from the center of the first sun gear 521 to the open side of the first sun gear 521. The second sun gear 522 has a smaller diameter than the first sun gear 521. The central axis of the second sun gear 522 is located coaxially with the central axis of the first sun gear 521. The second sun gear 522 has gear teeth protruding from the outer circumferential surface thereof, and is engaged with and coupled to the outer circumferential surface of the planetary gear 530.

The planetary gear 530 is engaged with and coupled to the ring gear 510 and the sun gear 520, and rotates and revolves in connection with the rotation of the sung gear 520. The planetary gear 530 in accordance with the embodiment of the present disclosure may be formed in a cylinder shape with gear teeth formed on the outer circumferential surface thereof. The planetary gear 530 is rotatably installed in the reducer 512. The central axis of the planetary gear 530 is spaced by a predetermined distance apart from the central axis of the reducer 512 in the radial direction of the reducer 512, and disposed in parallel to the central axis of the reducer 512. One side of the circumference of the planetary gear 530 is engaged with and coupled to the inner circumferential surface of the reducer 512, and the other side of the circumference of the planetary gear 530 is engaged with and coupled to the outer circumferential surface of the second sun gear 522. The planetary gear 530 receives a rotational force from the second sun gear 522, and revolves around the central axis of the reducer 512 while rotating on the central axis thereof. The planetary gear 530 may be formed as a plurality of planetary gears. The plurality of planetary gears 530 are arranged in the circumferential direction of the reducer 512 so as to be spaced by a predetermined distance apart from each other. FIG. 8 illustrates four planetary gears 530. However, the number of the planetary gears is not limited thereto, but may be changed to various values.

The carrier 540 is connected to the planetary gear 530, and transfers the rotational force of the planetary gear 530 to the piston unit 300. The carrier 540 in accordance with the embodiment of the present disclosure is formed in substantially a disk shape, and disposed between the support part 513 and the planetary gears 530.

The carrier 540 has a connection shaft 541 connected to the planetary gear 530. The connection shaft 541 in accordance with the embodiment of the present disclosure may be formed in the shape of a rod extended from one surface of the carrier 540, facing the planetary gear 530. The central axis of the connection shaft 541 is disposed in parallel to the central axis of the carrier 540. The connection shaft 541 is inserted through the central axis of the planetary gear 530, and rotatably supports the planetary gear 530. The connection shaft 541 is provided as a plurality of connection shafts that rotatably support the respective planetary gears 530. The connection shaft 541 transfers a rotational force, generated by the revolution of the planetary gear 530, to the carrier 540. Thus, the carrier 540 may be rotated on the central axis thereof, when the planetary gear 530 revolves.

The carrier 540 has a coupling part 542 connected to the ball screw 310. The coupling part 542 in accordance with the embodiment of the present disclosure may be formed in the shape of a hole formed through the central axis of the carrier 540. The coupling part 542 has a cross-section corresponding to the rear end of the ball screw 310 having spline teeth formed thereon. With the rear end of the ball screw 310 inserted into the coupling part 542, the coupling part 542 is engaged with and coupled to the outer circumferential surface of the rear end of the ball screw 310. Therefore, the carrier 540 may be rotated on the central axis thereof, and transfer the rotational force to the ball screw 310.

Figure 10:
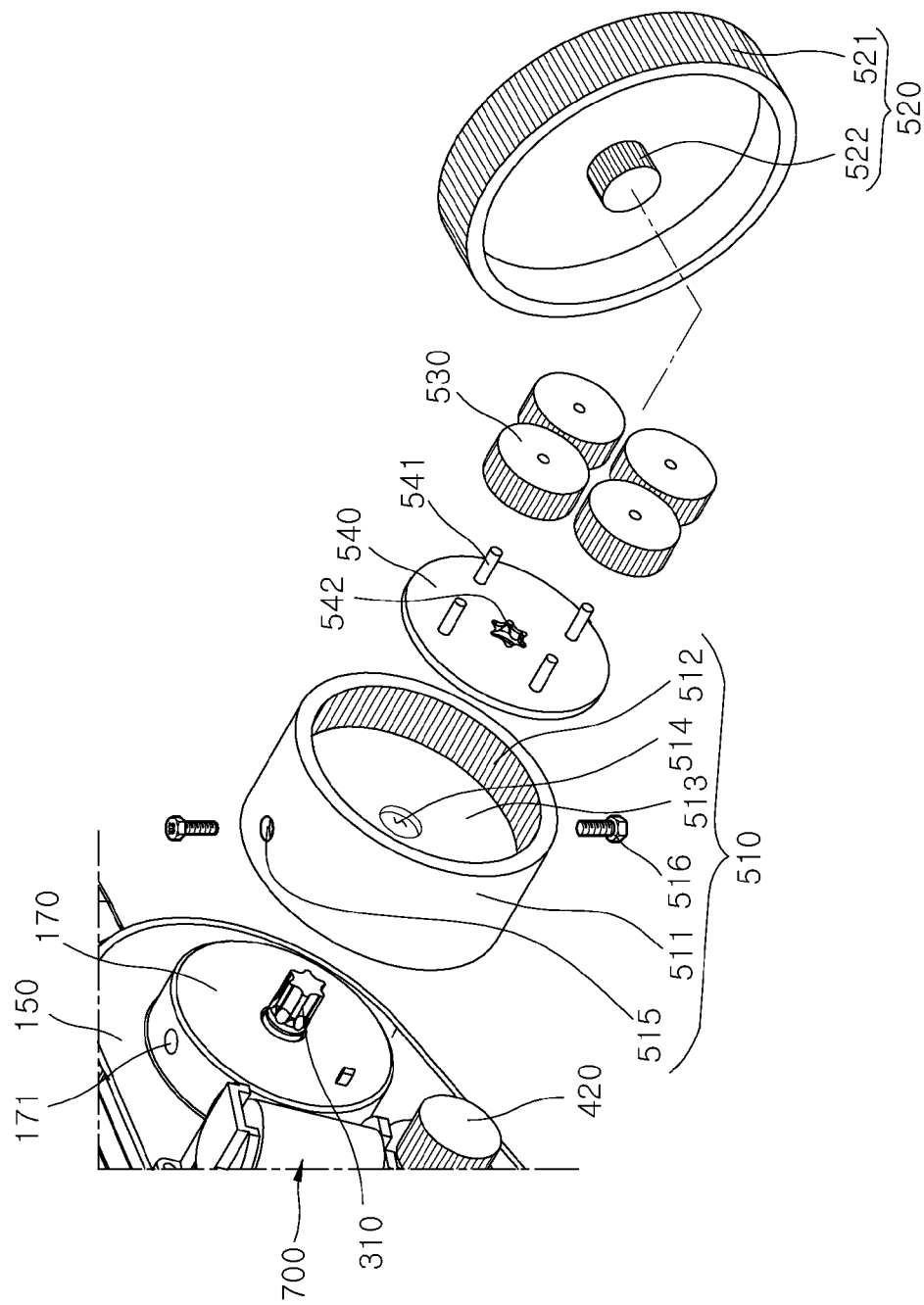
FIG. 10 is an exploded perspective view schematically illustrating a modified example of the planetary gear unit in accordance with the embodiment of the present disclosure.
Figure 11:
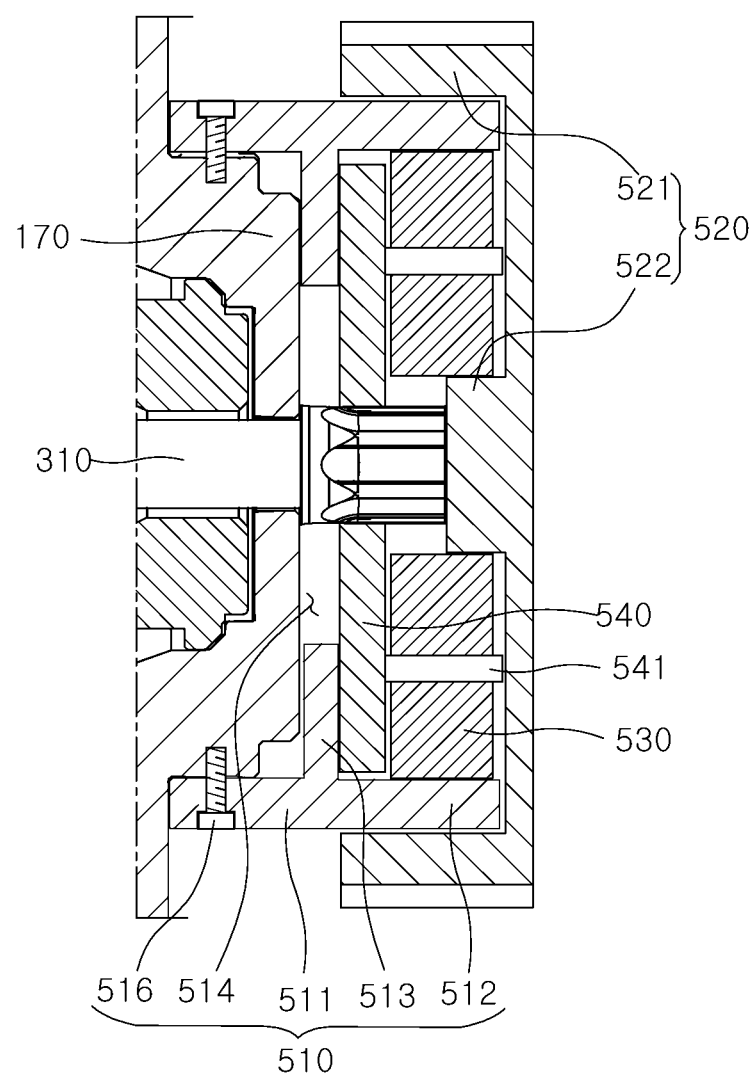
FIG. 11 is an expanded cross-sectional view schematically illustrating the modified example of the planetary gear unit in accordance with the embodiment of the present disclosure.

FIG. 10 is an exploded perspective view schematically illustrating a modified example of the planetary gear unit in accordance with the embodiment of the present disclosure, and FIG. 11 is an exploded cross-sectional view schematically illustrating the modified example of the planetary gear unit in accordance with the embodiment of the present disclosure.

Hereafter, a modified example of the planetary gear unit 500 in accordance with the embodiment of the present disclosure will be described in detail with reference to FIGS. 10 and 11. During this process, descriptions overlapping those of the planetary gear unit 500 illustrated in FIGS. 8 and 9 will be omitted herein, for convenience of description.

In this modified example, the ring gear 510 may be bolted to the second assembly part 170 through a fixing bolt 516.

More specifically, the second assembly part 170 has a plurality of first coupling holes 171 formed through the outer circumferential surface of the second assembly part 170 in the radial direction of the second assembly part 170. The plurality of first coupling holes 171 are arranged in the circumferential direction of the second assembly part 170 so as to be spaced by a predetermined distance apart from each other. The first coupling hole 171 has a screw thread formed on the inner circumferential surface thereof.

The fixed part 511 has a plurality of second coupling holes 515 formed through the outer circumferential surface of the fixed part 511 in the radial direction of the fixed part 511. The plurality of second coupling holes 515 are arranged in the circumferential direction of the fixed part 511 so as to be spaced by a predetermined distance apart from each other. The second coupling holes 515 are aligned coaxially with the respective first coupling holes 171. The second coupling hole 515 may have a larger diameter than the first coupling hole 171.

The fixing bolt 516 may be formed in the shape of a bolt whose one end has a larger diameter than the other end. The other end of the fixing bolt 516 has a screw thread formed on the outer circumferential surface thereof. The other end of the fixing bolt 516 is screwed to the inner circumferential surface of the first coupling hole 171 sequentially through the second coupling hole 515 and the first coupling hole 171. As the other end of the fixing bolt 516 is completely coupled to the first coupling hole 171, the one end of the fixing bolt 516 is seated in the second coupling hole 515. Therefore, the fixing bolt 516 may reliably fix the ring gear 510 to the second assembly part 170, while not being disturbed by the rotation of the sun gear 520.

A parking gear unit 600 receives a rotational force from the driving unit 200, and is rotated with the transfer gear unit 400. The parking gear unit 600 in accordance with the embodiment of the present disclosure is disposed coaxially with the first transfer gear 410, and fitted to an end of the output shaft 201 of the driving unit 200. When the output shaft 201 is rotated, the parking gear unit 600 may be rotated on the central axis at the same angular velocity as the first transfer gear 410. Thus, the parking gear unit 600 may reduce the magnitude of a load applied to the constraint unit 700 which will be described below, compared to when the parking gear unit 600 is connected to the second transfer gear 420 or the planetary gear unit 500 which has a rotational force boosted by a gear ratio. The parking gear unit 600 has a plurality of parking protrusions formed on the outer circumferential surface thereof so as to protrude in the radial direction of the parking gear unit 600. The plurality of parking protrusions are arranged in the circumferential direction of the parking gear unit 600 so as to be spaced apart from each other by a predetermined distance.

The constraint unit 700 is disposed so as to face the parking gear unit 600, and selectively fastened to the parking gear unit 600 so as to restrict or allow the rotation of the parking gear unit 600. More specifically, during parking braking, the constraint unit 700 is fastened to the parking gear unit 600 while the piston unit 300 pressurizes the brake pad 30, and restricts the rotations of the parking gear unit 600, the transfer gear unit 400, and the planetary gear unit 500. Furthermore, when parking braking is released, the constraint unit 700 is separated from the parking gear unit 600 and allows the rotations of the parking gear unit 600, the transfer gear unit 400, and the planetary gear unit 500. Therefore, although the generation of the rotational force by the driving unit 200 is stopped during parking braking, the constraint unit 700 may prevent a loss in brake force, which may occur while the transfer gear unit 400 and the planetary gear unit 500 are randomly rotated by the reaction forces of the piston unit 300 and the brake pad 30.

The constraint unit 700 in accordance with the embodiment of the present disclosure includes a parking driving unit 710, a constraint rod 720, and a constraint member 730.

The parking driving unit 710 is coupled to and supported by the caliper body 100 or specifically the assembly part 140, and generates a rotational force through power received from the outside. The parking driving unit 710 in accordance with the embodiment of the present disclosure may be exemplified as an electric motor that is electrically connected to a battery of the vehicle, receives power from the battery, and generates a rotational force through an electromagnetic interaction between a stator and a rotor.

The constraint rod 720 is moved forward and backward in connection with the rotational force generated by the parking driving unit 710. The constraint rod 720 in accordance with the embodiment of the present disclosure is formed in a substantially cylindrical shape, and disposed between the parking gear unit 600 and the parking driving unit 710. One side of the constraint rod 720, facing the parking gear unit 600, may be screwed to the output shaft of the parking gear unit 710, and convert the rotation of the parking driving unit 710 into linear reciprocation. The longitudinal direction of the constraint rod 720 is disposed perpendicular to the central axis of the parking gear unit 600.

The constraint member 730 is extended from the constraint rod 720, and fastened to or separated from the parking gear unit 600 according to the moving direction of the constraint rod 720. The constraint member 730 in accordance with the embodiment of the present disclosure protrudes from the edge of the other side of the constraint rod 720, facing the parking gear unit 600, toward the outer circumferential surface of the parking gear unit 600. The constraint member 730 may be provided as a pair of constraint members. The pair of constraint members 730 are spaced apart from each other with respect to the central axis of the constraint rod 720, while facing each other. As the constraint rod 720 is moved forward toward the parking gear unit 600 during parking braking, the pair of constraint members 730 are locked to the parking protrusions formed on the outer circumferential surface of the parking gear unit 600, and restrict the rotation of the parking gear unit 600. Furthermore, as the constraint rod 720 is moved backward in a direction away from the parking gear unit 600 when parking braking is released, the pair of constraint members 730 are separated from the parking protrusions, and allow the rotation of the parking gear unit 600. In addition to the shape illustrated in FIGS. 1 and 2, the specific shape of the constraint member 730 may be variously changed in design, as long as the constraint member 730 can be locked and coupled to the parking gear unit 600.

The case 800 is detachably coupled to the assembly part 140, and covers the transfer gear unit 400, the planetary gear unit 500, and the constraint unit 700. Thus, the case 800 may block foreign matters such as water and dust from flowing into the transfer gear unit 400, the planetary gear unit 500, and the constraint unit 700. The case 800 in accordance with the embodiment of the present disclosure may be formed in the shape of an empty hood whose one side is open. The case 800 has a cross-section corresponding to the cross-section of the assembly body 150. The open side of the case 800 is disposed toward the assembly body 150, and detachably coupled to the assembly body 150 by a screw or the like. In this case, an O-ring may be additionally installed on the contact region between the assembly body 150 and the case 800, and thus more effectively seal the internal space of the case 800.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
   a caliper body to be fixed to a vehicle body;
   a driving unit fixed to the caliper body, and generates a rotational force;
   a piston unit movably installed in the caliper body, and presses or releases a brake pad according to a moving direction of the piston unit;
   a transfer gear unit connected to the driving unit, and rotated by the rotational force received from the driving unit;
   a planetary gear unit fixed to the caliper body, and moves the piston unit forward and backward in connection with a rotation of the transfer gear unit, the planetary gear unit comprising:
   a ring gear fixed to a portion of the caliper body, the ring gear comprising:
   a fixed part fixed to the portion of the caliper body; and
   a reducer disposed coaxially with the fixed part;

a sun gear rotatably supported by the ring gear, and engaged with and coupled to the transfer gear unit;

a plurality of planetary gears engaged with and coupled to the ring gear and the sun gear, and rotates and revolves in connection with a rotation of the sun gear, wherein an inner circumferential surface of the reducer is engaged with and coupled to the plurality of planetary gears; and a carrier connected to the plurality of planetary gears, and transfers rotational forces of the plurality of planetary gears to the piston unit; and a support part disposed between the fixed part and the reducer, and extended inward in a radial direction of the ring gear.

2. The brake apparatus of claim 1, wherein the caliper body comprises:

a bridge;

a finger extended from one side of the bridge;

a cylinder extended from the other side of the bridge, and disposed to face the finger; and an assembly part extended from the cylinder, and supports the driving unit and the planetary gear unit.

3. The brake apparatus of claim 2, wherein the assembly part comprises:

an assembly body extended to one side of the cylinder in a radial direction of the cylinder;

a first assembly part disposed on one side of the assembly body, and supports the driving unit; and a second assembly part disposed on the other side of the assembly body, and supports the planetary gear unit.

4. The brake apparatus of claim 3, wherein the first assembly part comprises:

a seating groove concavely depressed in the assembly body, such that the driving unit is seated in the seating groove;

an insertion hole disposed through the seating groove, such that an output shaft of the driving unit is inserted into the insertion hole; and a fastening hole disposed through the assembly body, such that a fastening member fastened to the driving unit is inserted into the fastening hole.

5. The brake apparatus of claim 4, wherein the fastening hole includes a plurality of fastening holes which are arranged in a circumferential direction of the insertion hole so as to be spaced apart from each other.

6. The brake apparatus of claim 4, wherein the fastening hole faces a flange extended from the driving unit.

7. The brake apparatus of claim 4, wherein the first assembly part further comprises a sealing member disposed between the seating groove and the driving unit in order to prevent foreign matter from flowing into the driving unit.

8. The brake apparatus of claim 7, wherein the sealing member is elastically deformable, and is disposed along an inner circumferential surface of the seating groove.

9. The brake apparatus of claim 3, wherein the second assembly part protrudes from the assembly body in a direction parallel to an axial direction of the piston unit.

10. The brake apparatus of claim 9, wherein the second assembly part is disposed coaxially with the piston unit.

11. The brake apparatus of claim 3, wherein the ring gear is fixed to the second assembly part.

12. The brake apparatus of claim 11, wherein the second assembly part is inserted into the fixed part.

13. The brake apparatus of claim 12, wherein the fixed part is fixed as an inner circumferential surface thereof is press-fitted onto an outer circumferential surface of the second assembly part.

14. The brake apparatus of claim 12, wherein the fixed part is bolted to the second assembly part.

15. The brake apparatus of claim 14, wherein the second assembly part has a plurality of first coupling holes disposed therein, and the fixed part has a plurality of second coupling holes aligned coaxially with the first coupling holes, wherein the second assembly part and the fixed part are coupled to each other by a fixing bolt that sequentially passes through the second coupling hole and the first coupling hole.

16. The brake apparatus of claim 11, wherein the transfer gear unit comprises:

a first transfer gear rotated with an output shaft of the driving unit; and a second transfer gear rotated in connection with a rotation of the first transfer gear, and engaged with and coupled to the sun gear.

17. The brake apparatus of claim 16, wherein the second transfer gear has a larger diameter than the first transfer gear.

18. The brake apparatus of claim 2, further comprising a case detachably coupled to the assembly part, and covers the transfer gear unit and the planetary gear unit.

* * * * *